United States Patent [19]

Hoffman

[11] 4,320,221

[45] Mar. 16, 1982

[54] ADDITION POLYMERIZABLE ISOCYANATE-POLYOL ANAEROBIC ADHESIVES

[75] Inventor: Dwight K. Hoffman, Midland, Mich.

[73] Assignee: The Dow Chemical Company, Midland, Mich.

[21] Appl. No.: 215,996

[22] Filed: Dec. 12, 1980

[51] Int. Cl.³ .............................................. C08G 18/62
[52] U.S. Cl. ................................... 528/69; 156/306.3; 156/307.1; 156/331.4; 526/301; 526/302; 528/75
[58] Field of Search .................... 528/69, 75; 526/301, 526/302; 156/306.3, 307.1, 331.4

[56] References Cited

U.S. PATENT DOCUMENTS

| | | | |
|---|---|---|---|
| 2,882,259 | 4/1959 | Graham | 260/45.5 |
| 2,895,950 | 7/1959 | Kriebie | 260/89.5 |
| 3,425,988 | 2/1969 | Gorman et al. | 260/47 |
| 3,505,252 | 4/1970 | Brotherton et al. | 528/75 |
| 3,642,943 | 2/1972 | Noel | 260/859 |
| 3,928,299 | 12/1975 | Rosenkranz et al. | 96/33 |
| 4,018,851 | 4/1977 | Baccei | 204/159.15 |
| 4,043,982 | 8/1977 | O'Sullivan et al. | 526/194 |
| 4,082,634 | 4/1978 | Chang | 204/159.15 |
| 4,233,425 | 11/1980 | Tefertiller et al. | 525/455 |

*Primary Examiner*—Maurice J. Welsh
*Attorney, Agent, or Firm*—J. S. Boone

[57] ABSTRACT

The reaction product of an ethylenically unsaturated, monofunctional isocyanate, such as isocyanatoethyl methacrylate and a difunctional active hydrogen containing compound such as a polyol is useful as an anaerobic adhesive.

12 Claims, No Drawings

ADDITION POLYMERIZABLE ISOCYANATE-POLYOL ANAEROBIC ADHESIVES

BACKGROUND OF THE INVENTION

The instant invention relates to formulations useful as anaerobic adhesives.

Anaerobic adhesives are well known and have been in commercial use for several years. Most anaerobic adhesives are compositions containing a monomer, or combination of monomers, which will polymerize under certain conditions but not under other conditions. Those conditions generally favoring polymerization include the absence of oxygen and, if a redox initiator is used, the presence of metal ions. Oxygen acts as a polymerization inhibitor, and metal ions act as polymerization promoters.

Consequently, these adhesives find optimal use in situations where they are pressed tight between two metal surfaces, such as between the threads of a bolt and nut. The close fit effectively removes oxygen, and the metal surface provides metal ions. This combination of conditions causes the adhesive to polymerize, and a strong bond results.

While a significant breakthrough in the technology of anaerobic adhesives was made through the introduction of urethane bonds as described in U.S. Pat. No. 3,425,988 (1969), this technology is limited to reacting monofunctional alkyl and aryl acrylate esters containing hydroxy and amino functional groups with polyisocyanates. In some instances, it is desirable to include polyfunctional compounds such as polyglycols, bisphenols and polyamines, in addition to the monofunctional alkyl and aryl acrylate esters. These polyfunctional compounds serve two major functions: (1) to modify the physical properties of the resin and (2) to remove the unreacted and toxic excesses of isocyanate compounds. The isocyanate compounds are used in excess to reduce the amount of volatile and toxic monofunctional alkyl or aryl acrylate esters. Because of the tendency for polyisocyanates and polyahls to form network polymers (gel), the stoichiometry of the preceding reactions is limited.

In view of the aforementioned deficiencies of conventional adhesives, it is very desirable to provide an anaerobic adhesive that possesses all of the advantages of the recently developed polyurethane adhesives but does not have the stoichiometric limitations of such adhesives.

SUMMARY OF THE INVENTION

In one aspect, the present invention is an anaerobic adhesive comprising the reaction product of an addition polymerizable monoisocyanate and a polyahl, an addition polymerization initiator and a polymerization inhibitor wherein the relative proportions of the ingredients are such that the adhesive is stable to addition polymerization until the inhibitor is consumed at which time the adhesive polymerizes to form a solid material capable of bonding two substrates.

In another aspect, the present invention is a method for bonding two substrates which method comprises (1) depositing the adhesive at a bond site such that the adhesive contacts both substrates and (2) consuming the polymerization inhibitor, thereby polymerizing the adhesive to form a solid material that bonds the two substrates.

The adhesive of the present invention does not have the stoichiometric problems inherent in the polyurethane adhesives of the prior art. Thus, the polyahl and the monoisocyanate can be employed in any and all proportions without significant increases in viscosity. An additional advantage of these adhesives is that the process is simple and the product will consistently have the same viscosity, within a narrow specification range, time after time. This formulation flexibility will also allow higher levels of active hydrogen compound to be formulated into the system while maintaining a high efficiency of coupling. That is, at the same mole percent unsaturation, more molecules will contain both the moieties of the active hydrogen containing compound and the vinyl unsaturation of the isocyanate. Thus, the probability of phase separation is reduced. The ability to formulate over a wider range also means that products can be modified as required so that they are useful for bonding a greater variety of substrates.

As the examples show, the addition of addition polymerizable monoisocyanates to polyactive hydrogen compounds can be accomplished quite easily. In the case of polyethylene glycols, the adducts are low viscosity liquids which do not require reactive diluents such as isobutylmethacrylate (typical in U.S. Pat. No. 3,425,988) to reduce the resin to application viscosity. Excellent adhesive strengths have been obtained with simple formulations, as shown in the examples.

DETAILED DESCRIPTION OF THE INVENTION

As one component, the adhesive of this invention requires the reaction product of an ethylenically unsaturated monoisocyanate and a polyahl. This reaction product is then blended with other suitable components, including, but not limited to, an initiator and inhibitor.

Suitable isocyanates include any addition polymerizable ethylenically unsaturated monoisocyanates. Examples include vinyl isocyanate and vinylbenzyl isocyanate. More desirable monomers include isocyanatoalkyl esters of $\alpha,\beta$-ethylenically unsaturated carboxylic acids. Preferred are isocyanato acrylates of the formula:

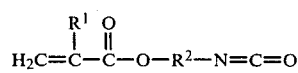

wherein $R^1$ is a hydrogen or a carbon chain of from 1 to 5 carbon atoms and $R^2$ is a carbon chain of from 1 to 7 carbon atoms. More preferred is 2-isocyanatoethyl acrylate. Most preferred is 2-isocyanatoethyl methacrylate (IEM).

The vinyl isocyanate is reacted with a "polyahl." The term "polyahl" generally includes any polyfunctional compounds having an average greater than 1 active hydrogen moiety which displays significant activity according to the Zerewitnoff test described by Woller in the *Journal of American Chemical Society*, Vol. 49, page 3181 (1927). Specifically included within the definition of polyahl are polyols, polyamines, polyamides, polymercaptans and polyacids. Also specifically included are compounds having more than one —SeH or —TeH groups. Further, suitable compounds may be those with active hydrogens supplied from more than one type of active hydrogen moiety. Examples of these compounds include amino alcohols and mercapto alcohols. Importantly, suitable polyahls also specifically include those compounds having 3 or more active hydrogen moieties per molecule.

Examples of amines which are suitable polyahls for use in the instant invention include ethylenediamine, 1,2- and 1,3-diaminopropane, 1,7-diaminohexane, monoethanolamine, diethanolamine, diaminobenzene, diaminotoluene and the like.

Examples of polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol; 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxylphenyl)-propane, commonly known as bisphenol A, and bisphenol F. Also included are alkylene oxide derivatives of bisphenol A, bisphenol F, etc., and hydrolyzed derivatives of epoxy resins such as hydrolyzed DER ® 331 (available from The Dow Chemical Company).

Illustrative oxiranes that are advantageously employed in the preparation of the polyether polyol include simple alkylene oxides such as ethylene oxide, propylene oxide, butylene oxide and amylene oxide; glycidyl ethers such as t-butyl glycidyl ether and phenyl glycidyl ether and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wirtz in 1859 and *Encyclopedia of Chemical Technology*, Vol. 7, pp. 257–262, published by Interscience Publishers, Inc. (1951) or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights up to about 5,000.

Polyhydric thioethers which are sometimes advantageously condensed with alkylene oxides include the reaction product of thiodiglycol with alkylene oxides or dihydric alcohol such as disclosed above for the preparation of the hydroxyl-containing polyethers with any other suitable thioether glycol.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol and alkyne thiols such as 3-hexyne-1,6-dithiol and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diaminotoluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,-beta-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol 1,1,1-trimethylolpropane, 1,1,1-trimethylolethane, hexane-1,2,6-triol, alpha-methyl glycoside, pentaerythritol and sorbitol. Also included within the term "polyhydric alcohol" are compounds derived from phenols such as 2,2(4,4'-hydroxyphenyl)propane, commonly known as bisphenol A.

Other polyahls suitably employed include polylactones, hydroxy functional acrylic polymers such as polymers of hydroxyethyl acrylate and hydroxypropyl acrylate, polyvinyl acetate and other polymers of vinyl acetate and other ethylenically unsaturated carboxylic acids, hydroxy-containing epoxy resins, urea-formaldehyde and melamine-formaldehyde resins, hydroxyl-containing polycarbonates and polyurethanes, methylol resins, starches and other cellulosic polymers, esters of phosphoric, sulfonic, sulfuric and boric acid and polypeptides.

Additional polyols include glycols such as ethylene glycol, 1,2-propylene glycol, 1,3-propylene glycol, 1,4-butylene glycol, 1,3-butylene glycol, 1,2-butylene glycol and the like, glycerine, 1,1,1-trimethylolpropane, pentaerythritol and the like.

Polymercaptans include hydrogen sulfide, 1,2-dimercaptoethane, 1,3-dimercaptopropane, low molecular weight Thiokol ® polysulfide elastomers and the like.

Polyphenols include bisphenol A, bisphenol F and the like.

Polyacids include adipic acid, sebaccic acid, terephthalic acid and the like.

Other polyahls include compounds having mixed functionalities such as 2-mercaptoethanol, 2-aminoethanol, mercaptophenol and the like.

Of the above classes of polyahls; polyols, polymercaptans and polyamines are preferred. Polyols are particularly available and safe to handle, as well as easy to use. Glycols and glycol ethers are readily used in the invention.

Polyamines are particularly interesting because their products have an unusually long shelf life. Unlike other polyahls, polyamines react readily with isocyanate moieties, without the need for added catalyst. It is believed that this lack of catalyst in the amine/isocyanate reaction contributes to the long shelf life of these adhesives.

In this context, "polyamine" is intended to mean any polyahl wherein an average greater than one of the active hydrogen moieties is provided by amine groups. A polyamine may generally be illustrated by the formula:

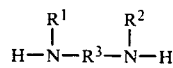

wherein $R^1$ and $R^2$ are each a hydrogen or an organic group and $R^3$ is an organic group. Aminated polyglycols are examples of suitable polyamines. Other examples include ethylenediamine, 1,4-butylenediamine and the like.

In formulating an adhesive according to the invention, the isocyanate and polyahl should be reacted in a ratio such that the reactant is capable of being addition polymerized to a substantially solid material. Since suitable polyahls specifically include those compounds having 3 or more active hydrogen moieties per molecule, in defining reaction ratios it is important to specify whether equivalent ratios or molecular ratios are being used. It is generally desirable, from a toxicological standpoint, to have a slight excess of active hydrogen moiety. From an adhesive standpoint, it is desirable to have at least 1 molecule of isocyanate for each molecule of polyahl. An excess of isocyanate is not unduly harmful to the adhesive properties. Preferably, there should be about one equivalent of isocyanate for each equivalent of polyahl.

Other useful products can be obtained by reacting the above-described ethylenically unsaturated isocyanates with monofunctional active hydrogen compounds having addition polymerizable ethylenic unsaturation. Exemplary examples include monohydroxy acrylic monomers such as 2-hydroxyethyl methacrylate, 2-hydroxyethyl acrylate and the like. These reaction products may be used by themselves as anaerobic adhesives, but preferably are added to the reaction product of a vinyl isocyanate and polyahl. In one aspect, the reaction products of the monohydroxy acrylic monomers may be used as a diluent, decreasing the viscosity of the final product.

With the exception of polyamines as discussed hereinbefore, a catalyst will be needed to react the active hydrogen moiety and the isocyanate. Suitable catalysts include those catalysts commonly used in the manufacture of urethane foams. These and other catalysts, and their use are well known to those skilled in the polyurethane art. Further information may be obtained, for example, in U.S. Pat. No. 4,233,425.

To be useful as an anaerobic adhesive, the isocyanate-polyahl reaction product requires a free radical generating means capable of initiating addition polymerization of the reaction product. Any free radical generating means such as a peroxygen compound, an azo compound, a UV source and/or a heat source which is suitably employed in the addition polymerization of ethylenically unsaturated monomers is suitably employed in the practice of this invention. Examples of such free radical generating means and conditions of use are set forth in U.S. Pat. No. 3,043,820. Preferred free radical generating means are chemical initiators, especially the peroxygen compounds such as hydrogen peroxide and the entire class of organic peroxides and hydroperoxides such as cumene hydroperoxide and t-butyl hydroperoxide. Such initiators or other free radical generating means are employed in a curing amount, that is, an amount sufficient to cause the desired polymerization of the reaction product. In the case of hydroperoxides, such are preferably employed in amounts as low as 0.01 weight percent based on the weight of the reaction product, more preferably from about 1 to about 10 weight percent.

Although not required, it is often preferable to employ an accelerator in combination with the initiator. Accelerators are compounds which are believed to assist in the breakdown of the initiator and increase the rate of initiator breakdown. Typical accelerators include tertiary amines such as N,N'-dimethylaniline; N,N'-dimethyl-p-toluidene; triethylamine; and imides such as benzoic sulfimide. Such accelerators may be used in quantities of 0.01 to 15 percent by weight based on the weight of initiator, with 0.1 to 7 percent being preferred.

Metal ions are particularly effective and useful accelerators. While metal ions may be specifically added to the composition, a trace amount will possibly be present as an impurity. In any event, if the adhesive is applied to a metal substrate, the substrate will provide the metal ion source. The application of the adhesive to a metal is particularly advantageous in that it delays the breakdown of the initiator until the adhesive is actually being used. Examples of effective metal ions include $Cu^+$, $Fe^{++}$, $Cr^{++}$ and $V^{++}$. The metal ions need be present only in catalytic (trace) amounts.

Because the aforementioned initiators or combination of initiator and accelerators promote polymerization quite well, it is generally required to employ an inhibitor to prevent premature polymerization. Examples of such inhibitors are antioxidants including phenols such as 2,6-di-tert-butyl-4-methylphenol (Ionol ®), quinones such as benzoquinone, hydroquinones and other compounds that are known to inhibit addition polymerization of ethylenically unsaturated monomers. An effective amount of an inhibitor must be added to a useful adhesive formulation. An "effective amount" of an inhibitor is an amount which will prevent premature polymerization of the formulation. Excess inhibitor will cause long cure times. Preferably, the inhibitor is a quinone or a hydroquinone which is preferably employed in an amount in the range from about 5 to 10,000 ppm based on the formulation weight, more preferably from about 50 to about 1,000 ppm.

While a free-radical initiator and inhibitor are, in practical terms, requirements, the other components of the initiator system are optional. Some applications will need none or only some of the other ingredients.

The adhesive of the instant invention is utilizable in a number of applications. Uses include adhesives and metal impregnation. Specific applications include locking threaded assemblies, sealing threaded, porous and flanged assemblies, strengthening cylindrical assemblies and structural bonding. Substrates to be bonded include metals, plastics, ceramics and glass. Potential medical applications include tooth and bone cementing sealants.

In applications such as locking the threads of steel bolts and nuts, the oxygen which is present in the adhesive is quickly consumed by the initiator and the physical barrier of the threads prevents the infusion of new oxygen. In other applications or in particular formulations, however, it may be desirable to specifically remove the oxygen from the system. Such removal may be by mechanical means such as a vacuum pump or by chemical means such as an oxygen consuming agent.

Further details of the invention will become apparent in the following examples. In the examples, all percentages are by weight, unless otherwise specified.

PREPARATION OF IEM, POLYAHL ADDUCTS

Adduct 1

IEM-Tetraethylene Glycol Adduct Using Dibutyltin Dilaurate

Tetraethylene glycol (194 g, 1 mole), Ionol ® (2,6-di-tert-butyl-4-methylphenol) antioxidant (0.2 g) and dibutyltin dilaurate (0.02 g) are combined into a 1 liter, 3-necked round bottom flask equipped with an addition funnel, mechanical stirrers, thermocouple and condenser. The mixture is heated to 70° C. and isocyanatoethyl methacrylate (280 g, 1.8 mole) is added over a two-hour period. The reaction is monitored by infrared spectroscopy. Portions of additional dibutyltin dilaurate (0.02 g) are added after 4 and 8½ hours. After 9½ hours at 70° C., more Ionol ® antioxidant (0.2 g) is added and the product is cooled. Infrared spectrography indicates that all of the isocyanate has reacted, due to lack of absorption at ~2,300 cm$^{-1}$. The final product is a clear viscous liquid.

Adduct 2

IEM-Diethylene Glycol Adduct Using Dibutyltin Dilaurate

Diethylene glycol (106 g, 1 mole), Ionol ® antioxidant (0.2 g) and dibutyltin dilaurate (0.2 g) are combined in the apparatus as described for Adduct 1. The mixture is heated to 70° C. and IEM (295 g, 1.9 mole) is added over a 45-minute period. Additional dibutyltin dilaurate (0.1 g) is added after 6 hours. After 6½ hours, more Ionol ® antioxidant (0.2 g) is added and the product cooled. The final product is a clear viscous liquid.

Adduct 3

IEM-Triethylene Glycol Adduct Using Dibutyltin Dilaurate

Triethylene glycol (150 g, 1 mole), Ionol ® antioxidant (0.2 g) and dibutyltin dilaurate (0.2 g) are combined in the apparatus as described for Adduct 1. The mixture is heated to 70° C. and IEM (295 g, 1.9 mole) is added over a 1¼-hour period. Additional dibutyltin dilaurate (0.1 g) is added after 7 hours. After 15 hours, more Ionol ® antioxidant (0.2 g) is added and the product cooled. The final product is a clear viscous liquid.

Adduct 4

IEM-Tetraethylene Glycol Adduct Using Triethylamine

Tetraethylene glycol (194 g, 1 mole), Ionol ® antioxidant (0.2 g) and triethylamine (2.0 g) are combined in the apparatus as described for Adduct 1. The mixture is heated to 75° C. and IEM (295 g, 1.9 mole) is added over a 50-minute period. After 2 hours and 20 minutes, more Ionol ® antioxidant (0.2 g) is added and the product cooled. The final product is a clear viscous liquid.

Adduct 5

IEM-Bisphenol A Adduct Using Triethylamine

Bisphenol A (228 g, 1 mole), Ionol ® antioxidant (0.2 g) and triethylamine (2.0 g) are combined in the apparatus as described for Adduct 1. The mixture is heated to 175° C. and a molten mixture is obtained. IEM (295 g, 1.9 mole) is added over a 15-minute period while cooling the mixture to 80° C. After 2 hours, more Ionol ® antioxidant (0.2 g) is added and the product cooled. The final product is a white, waxy solid. Similar products can be made more easily by using phenolic resins with lower melting temperatures. Examples include plant grade bisphenol A and liquid bisphenol A bottoms from the purification of bisphenol A.

Adduct 6

IEM-Ethylenediamine Adduct

Ethylenediamine (60.0 g, 2 equivalents active hydrogen) and Ionol ® antioxidant (0.15 g) are combined in the apparatus as described for Adduct 1. The mixture is at room temperature and IEM (194 g, 1.9 moles) is added over a 1-hour period. The temperature rises to 125° C. The final product is a solid which will not melt at 125° C.

ADHESIVE FORMULATIONS

EXAMPLE 1

Use of Adduct 1 as an Adhesive

The isocyanatoethyl methacrylate adduct with tetraethylene glycol, as described for Adduct 1 (6.23 g) is formulated with cumene hydroperoxide (0.3 g) and N,N'-dimethylaniline (0.05 g). This mixture is applied onto the uncleaned threads of ⅜ inch stainless steel cap screws and nuts. After 5 minutes, the torque needed to move the nuts was significantly increased, and after 15 minutes the nuts were unable to be moved by hand. After full cure, a prevailing torque of 3.5 ft/lbs (0.484 Kg-meters) is needed to remove the nut.

EXAMPLE 2

IEM-Tetraethylene Glycol Formulations

The IEM-tetraethylene glycol Adduct 1 is formulated according to Table I. In Table I, all parts are by weight. The formulated adhesives are then applied to cap screws as described in Example 1. Results are obtained as shown in Table II.

TABLE I

| Ingredient | Formulations | | | |
|---|---|---|---|---|
| | A | B | C | D |
| Adduct 1 | 10.0 | 10.0 | 10.0 | 10.0 |
| 70% t-butyl hydroperoxide | 0.7 | | | |
| Triethylamine | 0.2 | | | |
| Cumene hydroperoxide | | 0.2 | 0.2 | 0.2 |
| Benzoic sulfamide | | 0.05 | 0.05 | 0.05 |
| N,N-dimethyl-p-toluidine | | | 0.05 | 0.10 |
| Benzoquinone | | | 0.004 | 0.006 |

TABLE II

Testing of IEM-Tetraethylene Glycol Adduct Formulations

| Formulation | Cure Time (hr) | Prevailing Torque | |
|---|---|---|---|
| | | (ft/lb) | (Kg-meters) |
| B | 1 | 0.0 | 0.00 |
| C | 1 | 3.9 | 0.54 |
| D | 1 | 2.3 | 0.32 |
| A | 18 | 8.0 | 1.11 |
| B | 18 | 6.7 | 0.93 |
| C | 18 | 4.7 | 0.65 |
| D | 18 | 4.8 | 0.66 |

EXAMPLE 3

IEM-Polyethylene Glycol Formulations

IEM-polyethylene glycol Adducts 1, 2 and 3 are formulated using the following recipe:
10.0 g adduct
0.5 g cumene hydroperoxide
0.006 g quinone.

These formulations are applied to clean (washed with methylene chloride) ⅜ inch (0.952 cm) SAE (Society of Automotive Engineers) cap screws and clean (washed with methylene chloride) and unclean ⅜ inch stainless steel (SS) cap screws (used as received) as described in Example 1. Results are obtained as shown in Table III.

TABLE III

Comparison of IEM-Polyethylene Glycol Adducts

| Sample No. | Resin | | Screw Type | Cleaned | Prevailing Torque | |
|---|---|---|---|---|---|---|
| | (Example) | (IEM + Glycol) | | | (ft-lb) | (Kg-meter) |
| 1 | 2 | diethylene | SS | no | 5.2 | 0.72 |
| 2 | 3 | triethylene | SS | no | 5.4 | 0.75 |
| 3 | 1 | tetraethylene | SS | no | 6.8 | 0.94 |
| 4 | 2 | diethylene | SS | yes | 21.0 | 2.90 |
| 5 | 3 | triethylene | SS | yes | 24.7 | 3.41 |
| 6 | 1 | tetraethylene | SS | yes | 24.0 | 3.32 |
| 7 | 2 | diethylene | SAE | yes | 27.3 | 3.77 |
| 8 | 3 | triethylene | SAE | yes | 26.7 | 3.69 |
| 9 | 1 | tetraethylene | SAE | yes | 33.3 | 4.60 |

EXAMPLE 4

Shelf Stability of IEM-Polyamine Adduct Formulation

A polyamine, Jeffamine ® D400 available from Jefferson Chemical Co. (120.24 g, dried over a molecular sieve) is reacted with 94.02 g IEM which has been blended with 0.11 g Ionol ® inhibitor. The amine is added dropwise to the IEM at a rate such that the temperature of the reaction mixture does not exceed 50° C. An infrared spectrograph shows that the reaction is complete. The product is a translucent amber viscous liquid. Accelerated aging tests show the product to have excellent shelf stability.

The procedure is repeated except that the temperature is not allowed to exceed 30° C. The results are similar.

The first reaction product is formulated with 2.0 percent cumene hydroperoxide and 500 ppm Ionol ®. When placed in an 82° C. bath, the formulation gels in 20 minutes.

EXAMPLE 5

Shelf Stability of IEM-Polyol Adhesive Formulation

IEM (145.2 g) is reacted with tetraethylene glycol (90.0 g) in the presence of 0.235 g zinc octoate and a total of 0.227 g Ionol ® and 0.225 g Dabco ® (triethylenediamine). As in Example 4, the product is formulated with 2.0 percent cumene hydroperoxide and 500 ppm Ionol ®. This formulation gels in less than 3 minutes when placed in an 82° C. bath.

What is claimed is:

1. An adhesive comprising:
   (a) the reaction product of:
   (1) an addition polymerizable ethylenically unsaturated isocyanate and
   (2) a polyahl;
   (b) a curing amount of a polymerization initiator; and
   (c) a stabilizing amount of an inhibitor.

2. The adhesive of claim 1 wherein the ethylenically unsaturated isocyanate has the formula:

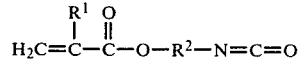

wherein $R^1$ is a hydrogen or a carbon chain of from 1 to 5 carbon atoms and $R^2$ is a carbon chain of from 1 to 7 carbon atoms.

3. The adhesive of claim 2 wherein the ethylenically unsaturated isocyanate is 2-isocyanatoethyl methacrylate or 2-isocyanatoethyl acrylate.

4. The adhesive of claim 1, 2 or 3 wherein the polymerization initiator is a free-radical initiator.

5. The adhesive of claim 4 wherein the polymerization initiator is a peroxygen compound.

6. The adhesive of claim 5 wherein the polymerization initiator is an organic peroxide or hydroperoxide.

7. A method of bonding substrates at a bond site comprising placing the adhesive of claim 1 at the bond site so as to form a bond.

8. The method of claim 7 wherein the ethylenically unsaturated isocyanate has the formula:

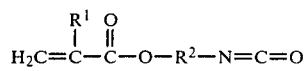

wherein $R^1$ is a hydrogen or a carbon chain of from 1 to 5 carbon atoms and $R^2$ is a carbon chain of from 1 to 7 carbon atoms.

9. The method of claim 7 wherein the ethylenically unsaturated isocyanate is 2-isocyanatoethyl methacrylate or 2-isocyanatoethyl acrylate.

10. The method of claim 7, 8 or 9 including the additional step of removing oxygen from the bond site.

11. The method of claim 7, 8 or 9 including the additional step of applying pressure to the bond site.

12. The adhesive of claim 1, 2 or 3 wherein the polyahl is a polyol.

* * * * *